April 3, 1928.

A. G. PERKINS 1,664,941

PIPE JOINT

Filed May 4, 1926

Inventor,
Albert G. Perkins,
by Geyer & Geyer
Attorneys.

Patented Apr. 3, 1928.

1,664,941

UNITED STATES PATENT OFFICE.

ALBERT G. PERKINS, OF BUFFALO, NEW YORK.

PIPE JOINT.

Application filed May 4, 1926. Serial No. 106,690.

This invention relates to improvements in a flexible pipe joint designed more particularly for use in connection with the concrete conduits of tunnel and well construction as well as of water pipe lines.

One of its objects is to provide an internally applied concrete pipe joint of this character having the necessary flexibility for laying such pipes in irregular and swampy ground, and which, while compensating for expansion and contraction, permits the pipe-sections to become misaligned when the ground settles without danger of leakage.

Another object of the invention is the provision of a flexible pipe joint whose parts are assembled and contained wholly within the pipe, thereby rendering the same particularly useful in laying conduits in quicksand and other places where it is difficult to make and seal an external joint.

Figure 1:
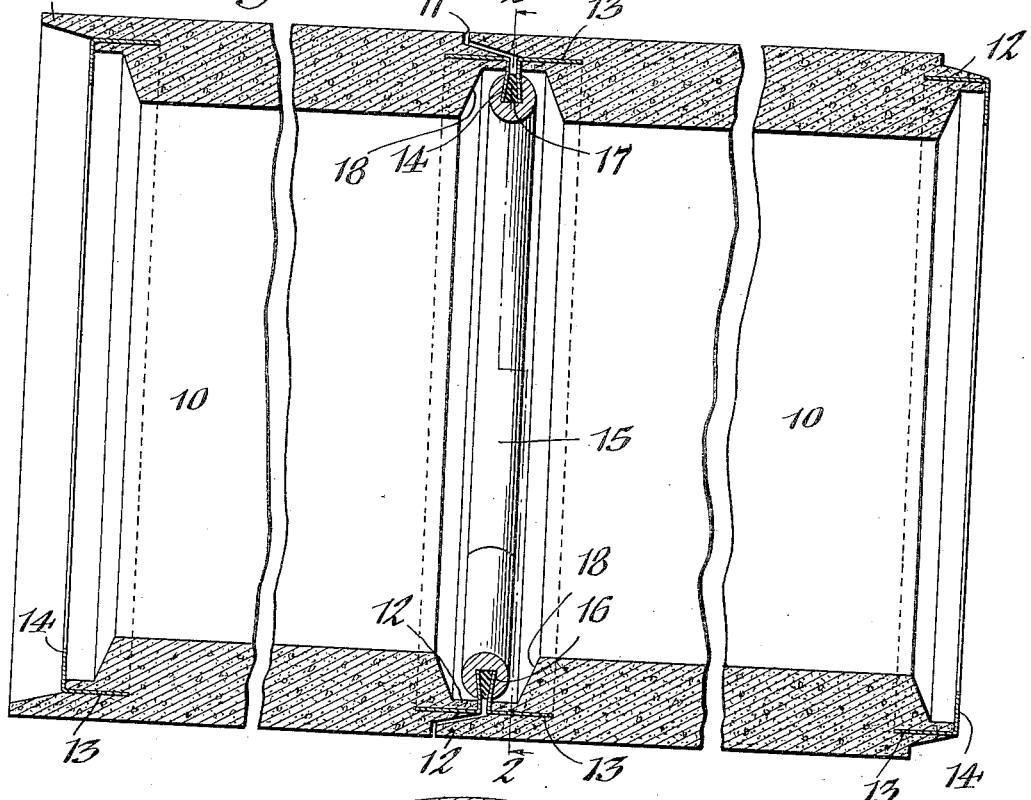
Figure 2:
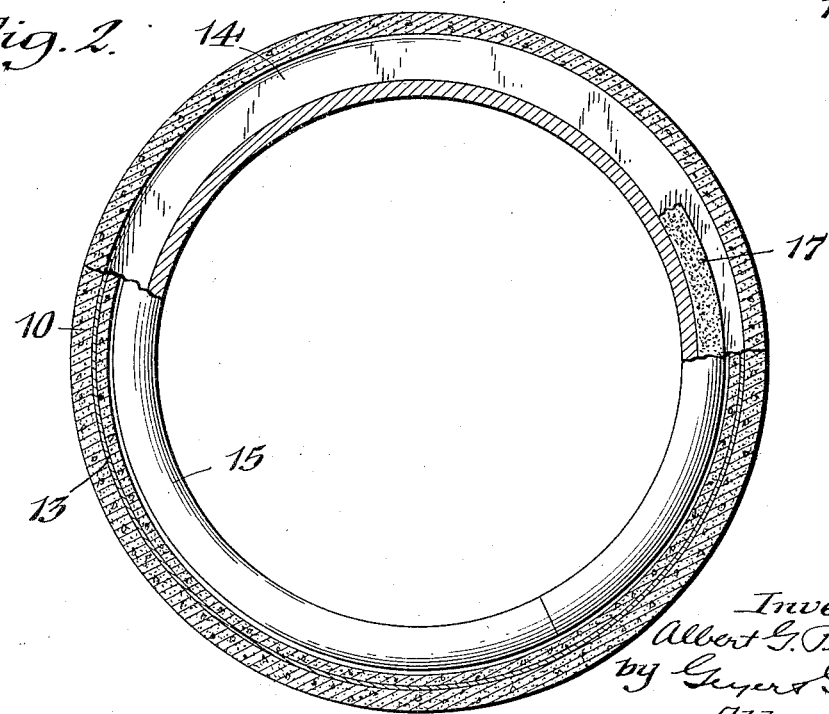

In the accompanying drawings:

Figure 1 is a fragmentary central longitudinal section of two concrete pipes showing my improved joint applied thereto. Figure 2 is a transverse section on line 2—2, Fig. 1.

Similar characters of reference indicate corresponding parts throughout the several views.

The numerals 10, 10 indicate a pair of concrete pipe-sections connected by my improved flexible joint or coupling, said sections being of a comparatively large diameter so that workmen are able to enter them to assemble the joint. The opposing ends of these pipe-sections meet in a scarf or rabbet joint 11, as shown, the ends of the respective sections terminating in interlocking annular flanges 12, 12 for this purpose. Sufficient clearance is left between the adjoining ends of the pipe-sections to permit them to expand and contract and to assume a more or less angular position relative to each other.

At their ends, the pipe-sections are provided with metallic bands or coupling rings of substantially L-shape in cross-section and made of copper or other malleable material, each ring including a base or attaching portion 13 embedded in the end of the respective pipe-section, and an inwardly-facing annular flange 14 which is disposed transversely to the axis of the pipe-section and in the plane of its joint edges. As shown at the opposite ends of Fig. 1, these flanges project radially inward a suitable distance beyond and clear of the inner wall of the pipe-structure, and they overlap the contiguous joint faces thereof. When the mating ends of two pipe-sections are brought together, their flanged coupling rings are disposed side by side for clamping them to produce a flexible and water tight joint capable of withstanding high pressures.

Embracing the inner marginal edges of the flanges 14 of adjoining coupling rings is an annular clamping member or split ring 15 which is likewise constructed of copper or similar material. In its exterior face, said clamping ring has a circumferential groove 16 with which the coupling ring flanges engaged. A packing 17 of lead or similar material may be placed between the opposing ring-flanges to effectually seal the joint. As shown in Fig. 1, the exterior face of the clamping ring is preferably free from contact with the interior wall of the pipe-structure to permit the ring-flanges 14 to flex freely to compensate for misalignment of the sections.

The opposing ends of the pipe-sections 10, 10 are preferably provided with internal grooves 18 which together form a recess or pocket for receiving the coupling rings 14 and clamping ring 15, whereby such parts are practically flush with the interior of the pipe-line and do not interfere with the flow of the water therein. This recess is of the proper dimensions to permit the ready application of the clamping ring about the coupling ring flanges 15.

In assembling the joint between the pipe-sections, which is necessarily done wholly within their interior, the adjoining ends of the sections are brought together with their ring-flanges 14 arranged side by side and the packing between them after which the clamping ring 15 is fitted around said flanges with the latter engaging the groove 16 of the former. The clamping ring is firmly secured to the attaching flanges by rolling or pinching its sides by hydraulic pressure or otherwise against the sides of the flanges, which together with the packing 17, are compressed and crowded into the coupling ring groove, producing a practically integrally united structure and forming a fluid-tight joint. As shown in Fig. 1, the outer edges of the clamping ring are pinched about the coupling ring flanges, which results in a dove-tailed interlocking of these parts and causes the soft packing 17 to be crowded firmly toward the bottom of the ring-groove 16.

This improved internal joint is exceedingly simple, strong, compact and inexpensive in construction and by reason of the fact that the joint is assembled wholly within the pipe, it is particularly adapted for use in tunnel and well work, and when laying pipes and conduits in quicksand, where it is practically impossible to make an external joint without the expenditure of a material amount of time and labor. In addition, this joint possesses the necessary flexibility to expand and contract in response to temperature changes and ground vibrations and to adapt itself to misalignment of the pipe-sections and irregularities of the ground.

I claim as my invention:

1. In a flexible joint for concrete pipes, the combination of a pair of concrete pipe-sections, each provided at its ends with coupling rings having portions embedded therein, each ring having an annular flange projecting radially inward beyond and clear of the inner wall of the pipe-structure, and clamping means embracing the opposing flanges of the pipe-sections and free from engagement with the pipe-structure to permit said ring-flanges to flex and compensate for misalignment of the pipe-sections.

2. In a flexible joint for concrete pipes, the combination of a pair of concrete pipe-sections, each provided at its ends with coupling rings of flexible metal, each ring comprising a base portion embedded in the concrete pipe-section and an annular flange, all portions of which project radially inward from said base portion beyond the inner wall of the pipe-structure, and an internal clamping ring of malleable metal embracing the opposing flanges of the pipe-sections and adapted to be compressed about the inner marginal edges of the same, said clamping ring and those portions of the ring-flanges embraced by it being clear of and unimbedded in the pipe-structure.

3. In a flexible joint for concrete pipes, the combination of a pair of concrete pipe-sections, each provided at its ends with coupling rings of flexible metal, each ring comprising a base portion embedded in the concrete pipe-section and an annular flange, all portions of which project radially inward from said base portion beyond and clear of the inner wall of the pipe-structure, and a clamping ring of malleable metal having a circumferential groove in its exterior face for receiving said coupling ring flanges, said clamping ring being compressed about the latter to form a dove-tailed fluid-tight joint and being free from engagement with the pipe-structure to permit said ring-flanges to flex freely and compensate for misalignment of the pipe-sections.

ALBERT G. PERKINS.